US012341169B2

(12) United States Patent
Lester et al.

(10) Patent No.: US 12,341,169 B2
(45) Date of Patent: Jun. 24, 2025

(54) THERMAL MANAGEMENT SYSTEM

(71) Applicant: Flint Engineering Limited, East Sussex (GB)

(72) Inventors: Stephen Lester, East Sussex (GB); Hussam Jouhara, Greater Manchester (GB)

(73) Assignee: Flint Engineering Limited, East (GB)

( * ) Notice: Subject to any disclaimer, the term of this patent is extended or adjusted under 35 U.S.C. 154(b) by 0 days.

(21) Appl. No.: 17/260,451

(22) PCT Filed: Jul. 16, 2019

(86) PCT No.: PCT/EP2019/069161
§ 371 (c)(1),
(2) Date: Jan. 14, 2021

(87) PCT Pub. No.: WO2020/016251
PCT Pub. Date: Jan. 23, 2020

(65) Prior Publication Data
US 2021/0249705 A1  Aug. 12, 2021

(30) Foreign Application Priority Data

Jul. 18, 2018  (GB) ..................................... 1811746

(51) Int. Cl.
*H01M 10/613* (2014.01)
*F28D 1/03* (2006.01)
(Continued)

(52) U.S. Cl.
CPC ............ *H01M 10/613* (2015.04); *F28D 1/03* (2013.01); *F28D 1/05308* (2013.01);
(Continued)

(58) Field of Classification Search
None
See application file for complete search history.

(56) References Cited

U.S. PATENT DOCUMENTS 4,500,612 A    2/1985  Fujii et al.
6,776,220 B1 *  8/2004  Low ..................... B64G 1/50
                                            165/41
(Continued)

FOREIGN PATENT DOCUMENTS

CN    107546351       10/2020
DE   10 2014 101358    8/2015
(Continued)

OTHER PUBLICATIONS

Great Britain Search Report dated Jan. 11, 2019 for Great Britain Application No. GB1811746.5, 1 page.
(Continued)

*Primary Examiner* — Ula C Ruddock
*Assistant Examiner* — Mary Grace Byram
(74) *Attorney, Agent, or Firm* — McDonnell Boehnen Hulbert & Berghoff LLP

(57) ABSTRACT

Described herein is a system for thermal management of a component, such as a battery for an electric vehicle. The system comprises an electrical component and one or more panels thermally coupled to the electrical component. Each panel comprises a plurality of passages for conveying a working fluid around the panel. The one or more panels are arranged to form a hermetically sealed system such that the working fluid is configured to communicate heat energy around the sealed system. The system further comprises a heat exchanger mechanism in thermal communication with at least one of the plurality of panels so as to communicate heat energy to and/or from the electrical component via the plurality of panels.

19 Claims, 7 Drawing Sheets

(51) Int. Cl.

| | |
|---|---|
| *F28D 1/053* | (2006.01) |
| *F28D 15/02* | (2006.01) |
| *F28F 3/12* | (2006.01) |
| *F28F 9/26* | (2006.01) |
| *H01M 6/50* | (2006.01) |
| *H01M 10/60* | (2014.01) |
| *H01M 10/625* | (2014.01) |
| *H01M 10/6552* | (2014.01) |
| *H01M 10/6556* | (2014.01) |
| *H01M 10/6569* | (2014.01) |
| *H01M 10/6572* | (2014.01) |
| *H01M 50/209* | (2021.01) |
| *H01M 50/24* | (2021.01) |
| *H01M 50/249* | (2021.01) |
| *F25B 21/02* | (2006.01) |
| *F28D 20/00* | (2006.01) |
| *F28D 21/00* | (2006.01) |

(52) U.S. Cl.
CPC ......... *F28D 15/02* (2013.01); *F28D 15/0275* (2013.01); *F28F 3/12* (2013.01); *F28F 9/26* (2013.01); *H01M 6/5038* (2013.01); *H01M 10/60* (2015.04); *H01M 10/625* (2015.04); *H01M 10/6552* (2015.04); *H01M 10/6556* (2015.04); *H01M 10/6569* (2015.04); *H01M 10/6572* (2015.04); *H01M 50/209* (2021.01); *H01M 50/24* (2021.01); *H01M 50/249* (2021.01); *F25B 21/02* (2013.01); *F28D 2020/0004* (2013.01); *F28D 2021/0028* (2013.01); *F28D 2021/0029* (2013.01); *F28F 2250/08* (2013.01); *H01M 2220/20* (2013.01)

(56) References Cited

U.S. PATENT DOCUMENTS

| | | | | |
|---|---|---|---|---|
| 8,704,485 | B1* | 4/2014 | Tsukamoto | B60L 50/66 |
| | | | | 320/112 |
| 9,897,383 | B2 | 2/2018 | Yesin | |
| 2003/0232239 | A1* | 12/2003 | Gow | H01M 50/278 |
| | | | | 429/153 |
| 2004/0037045 | A1* | 2/2004 | Phillips | F28D 15/0233 |
| | | | | 361/719 |
| 2005/0170241 | A1 | 8/2005 | German et al. | |
| 2010/0252238 | A1 | 10/2010 | Batty | |
| 2011/0209864 | A1* | 9/2011 | Figus | F28D 15/0275 |
| | | | | 165/287 |
| 2013/0048254 | A1* | 2/2013 | Livingston | H01F 27/18 |
| | | | | 165/104.29 |
| 2013/0291559 | A1* | 11/2013 | June | F25B 21/00 |
| | | | | 62/3.2 |
| 2014/0065471 | A1* | 3/2014 | Kim | H01M 10/613 |
| | | | | 429/174 |
| 2014/0069113 | A1* | 3/2014 | Oh | B60L 1/003 |
| | | | | 62/3.3 |
| 2016/0211559 | A1* | 7/2016 | Frohnmayer | H01M 50/20 |
| 2016/0240903 | A1* | 8/2016 | Kossakovski | H01M 10/6551 |
| 2017/0077568 | A1 | 3/2017 | Huettel | |
| 2017/0130969 | A1 | 5/2017 | Lester | |
| 2018/0166757 | A1* | 6/2018 | Smoot | H01M 10/643 |
| 2019/0075681 | A1* | 3/2019 | Xiao | F28F 1/126 |
| 2019/0131674 | A1 | 5/2019 | Lu | |
| 2019/0193213 | A1 | 6/2019 | Omi | |
| 2019/0204014 | A1* | 7/2019 | Yoshinori | F28D 15/025 |
| 2020/0127347 | A1* | 4/2020 | Waddell | H01M 10/657 |
| 2020/0381791 | A1* | 12/2020 | Ahn | H01M 10/613 |
| 2021/0172593 | A1* | 6/2021 | Grosser | F28F 21/06 |

FOREIGN PATENT DOCUMENTS

| | | |
|---|---|---|
| EP | 2 154 466 | 2/2010 |
| WO | WO 2017/177831 | 2/2010 |
| WO | WO 2015/113161 | 8/2015 |
| WO | 2018047536 A1 | 3/2018 |

OTHER PUBLICATIONS

International Search Report and Written Opinion for International Application No. PCT/EP2019/069161 mailed Oct. 23, 2019, 11 pages.
Wikipedia entry, "Capillary Action," last edited Oct. 28, 2022, available at https://en.wikipedia.org/wiki/Capillary_action.

* cited by examiner

THERMAL MANAGEMENT SYSTEM

CROSS-REFERENCE TO RELATED APPLICATIONS

This application is a U.S. National Stage filing of International Patent Application no. PCT/EP2019/069161, filed Jul. 16, 2019, which claims the benefit of priority of United Kingdom Patent Application no. 1811746.5, filed Jul. 18, 2018.

FIELD

This relates to a system for thermal management of an electrical component, optionally an electrical component such as a battery or another electrical storage device. Optionally, this relates to a system for the thermal management of a battery of an electric vehicle.

BACKGROUND

Batteries and other electrical components or devices have an optimum operating temperature, and functioning outside of this range can affect the performance and safety of the component or device. For example, the ability of a battery to output a consistent supply of electricity is hindered when the battery is cold. Likewise, batteries also exhibit a drop in performance when hot, and in some instances can be known to catch fire, for example as a result of thermal runaway.

It is therefore desirable to provide a thermal management system for controlling a temperature of a battery. Such a system also has utility in other applications where it is preferable to maintain an electrical component at a constant temperature.

SUMMARY

A system is provided in accordance with independent claim 1, with optional features included in the dependent claims appended thereto.

In the following description, there is provided a system for thermal management of an electrical component. The system comprises: an electrical component; a heat exchanger mechanism; and one or more panels thermally coupled to the electrical component. Each panel comprises a plurality of passages for conveying a working fluid around the panel. The one or more panels are fluidly coupled to form a hermetically sealed system internal within the one or more panels, such that the working fluid is configured to communicate heat energy around the sealed system. The heat exchanger is provided in thermal communication with at least one of the plurality of panels, so as to communicate heat energy to and/or from the electrical component via the plurality of panels.

Optionally, the electrical component is a battery comprising a plurality of battery cells. In some arrangements, the battery is a battery for a vehicle, for example for an electric vehicle. In other arrangements, the battery can be a stationary battery for electrical storage, for example, a battery or storage device for domestic or commercial energy storage. Optionally, the electrical component is a transformer, a capacitor, a resistor, or an inductor, for example. Optionally, the electrical component could be a thermal electrical generator or device, or any other form of generator or processor.

Optionally, the working fluid comprises a working fluid in both liquid and gaseous phases, wherein the working fluid is configured to communicate heat energy around the sealed system through evaporation of the liquid at one location of the sealed system and condensation of the liquid at a different location of the sealed system. When one part of the sealed system is heated, the liquid turns to vapour upon absorbing the latent heat of vaporization. The hot vapour subsequently passes to the cooler part of the sealed system where it condenses and releases the latent heat to the sealed system. The condensed liquid then flows back to the hot part of the sealed system and the vaporization-condensation cycle repeats. Since the latent heat of vaporization is usually very large, considerable quantities of heat can be transferred around the sealed system and a substantially uniform temperature distribution can be achieved across the one or more panels. In other words, the panels can operate as heat pipes. This working fluid may be water, a refrigerant, an ammonia based working fluid, or any other suitable working fluid for a heat pipe.

The system described herein can facilitate the cooling and/or heating of an electrical component, such as a battery, in-situ (for example, for cooling and/or heating of a car battery within a vehicle). Each of the panels can operate as a flat heat pipe, i.e. as a thermally absorbent panel. By assembling one or more (hermetically sealed) thermally absorbent panels around the electrical component, either as one or more individual flat heat pipes, or assembled to form a box or other structure around the electrical component, the thermal environment around the electrical component can be managed efficiently and effectively to help maximise performance of said component.

In particular, the one or more panels provide an isothermal surface which, when thermally coupled to the electrical component, cools and/or heats the electrical component in an isothermal manner. For example, when the electrical component is a battery comprising a plurality of battery cells, the system described herein can transfer heat to/from the battery in such a way that each of the battery cells is maintained at substantially the same temperature—in other words, the temperature is (substantially) constant across the entire battery, which can help to improve the performance of the battery by facilitating an approximately equal power output from each of the battery cells, for example. The system can also help to isolate the battery or other electrical components from temperature variations in the battery's environs, which can facilitate an improvement in the performance of the electrical component.

Optionally, the system comprises a plurality of panels which are fluidly coupled to form a single hermetically sealed system and are arranged around the electrical component. Such an arrangement can provide more efficient communication of heat energy to/from the electrical component than a single panel. Optionally, the plurality of panels are arranged to substantially surround the electrical component. In one optional arrangement, the plurality of panels are arranged to form a box defining a cavity in which the electrical component is located. Such surrounding of the electrical component can provide for more efficient communication of heat energy to/from the electrical component and thus improve the performance of the electrical component.

Optionally, the system comprises two panels thermally coupled to the electrical component, each panel arranged to form an individual hermetically sealed system and arranged in thermal communication with the heat exchanger mechanism. For example, the two panels may be provided on opposing sides of the electrical component, with the heat exchanger arranged on a side extending between the two panels. This arrangement can provide efficient heat energy transfer, whilst facilitating simpler and cheaper manufacturing and assembly of the system.

Optionally, each individual panel (regardless of how the panels are arranged to form a hermetically sealed system) comprises one or more primary passages and one or more secondary passages. Optionally, a cross sectional area of the primary passages may be 50% to 200% a cross sectional area of the secondary passages. Optionally, each primary passage optionally has a cross-sectional area greater than a cross-sectional area of any of the secondary passages, which may facilitate improved flow of the working fluid around the hermetically sealed system, which may in turn improve the efficiency of the heat exchange process between the panels and the electrical component. Optionally, the plurality of panels are orientated such that the secondary channels run (generally) horizontally or (generally) vertically when the system is in use.

The primary passages are in fluid communication with the secondary passages. Optionally, the one or more primary passages extend in a direction perpendicular to a direction in which the one or more secondary passages extend. This arrangement can facilitate improved fluid flow around the system. Optionally, the one or more secondary passages comprise one or more protruding features on a side of the secondary passages; the protruding features may include one or more ribs extending lengthways in the passages. Here, at least some of the one or more ribs may be generally triangular and/or at least some of the one or more ribs may be generally square.

When more than one panel is used to form the hermetically sealed system, each of the plurality of panels can be fluidly coupled to one another through the primary passages of the respective panels. In some arrangements, the panels may be directly coupled, both fluidly and mechanically. In other arrangements, joining members may be provided which mechanically couple the panels, wherein the primary passages are fluidly coupled through the respective joining members, each joining member having one or more passages of a cross-sectional area greater than a cross-sectional area of the primary passages. This arrangement may provide for simpler manufacturing and assembly of the panels, as well as facilitating the improved flow of fluid around the sealed system. More effective heat transfer between panels may therefore be provided.

Optionally, the main body of each panel is formed of extruded material, i.e. manufactured by extruding the panel, such that the one or more secondary passages are formed as cavities within an interior of the panel. Such a panel can be easy and cheap to manufacture, and the extrusion process can allow for the cross section of each panel to be easily manufactured. The process can also facilitate the provision of complex cross-sectional geometries for the secondary passages within the panels, for example, the above-described protrusions. Optionally, each panel is formed of extruded aluminium or an aluminium alloy. Optionally, each panel further comprises one or more manifolds, which define, or contribute to defining, the primary passages of each panel. The manifolds may be coupled to edges of the main body of each panel to allow the primary passages to be fluidly coupled via the secondary passages.

Optionally, the system further comprises one or more fluid pumps arranged to pump a fluid through the heat exchanger. The fluid may be water or another fluid such as a refrigerant. Optionally, the system further comprises a heat tank for providing a heating fluid (wherein in an active heating mode of operation, the one or more fluid pumps are arranged to pump the heating fluid through a first inlet of the at least one inlet of the heat exchanger) and/or a low temperature storage device for a cooling fluid (wherein in an active cooling mode of operation, the one or more fluid pumps are arranged to pump the cooling fluid through a second inlet of the at least one inlet of the heat exchanger). Any suitable heating and/or cooling fluid may be provided. This arrangement can facilitate heating of the electrical component in cold weather and cooling of the electrical component in hot weather, which can provide for a more stable operating temperature for the electrical component. Performance of said component may therefore be improved. Such heating and/or cooling may be facilitated by way of existing systems already provided in the environs of the system described herein, for example, when the system is deployed in a vehicle. This may improve efficiency.

Optionally, the heat exchanger mechanism comprises a thermoelectric device. Use of a solid state heat exchanger with no moving parts of fluid channels may provide for a more robust heat exchanger, which may be of advantage in some applications, for example, for retro-fitting into a vehicle, for example.

BRIEF DESCRIPTION OF THE DRAWINGS

The following description is with reference to the following Figures.

DETAILED DESCRIPTION

Figure 1:
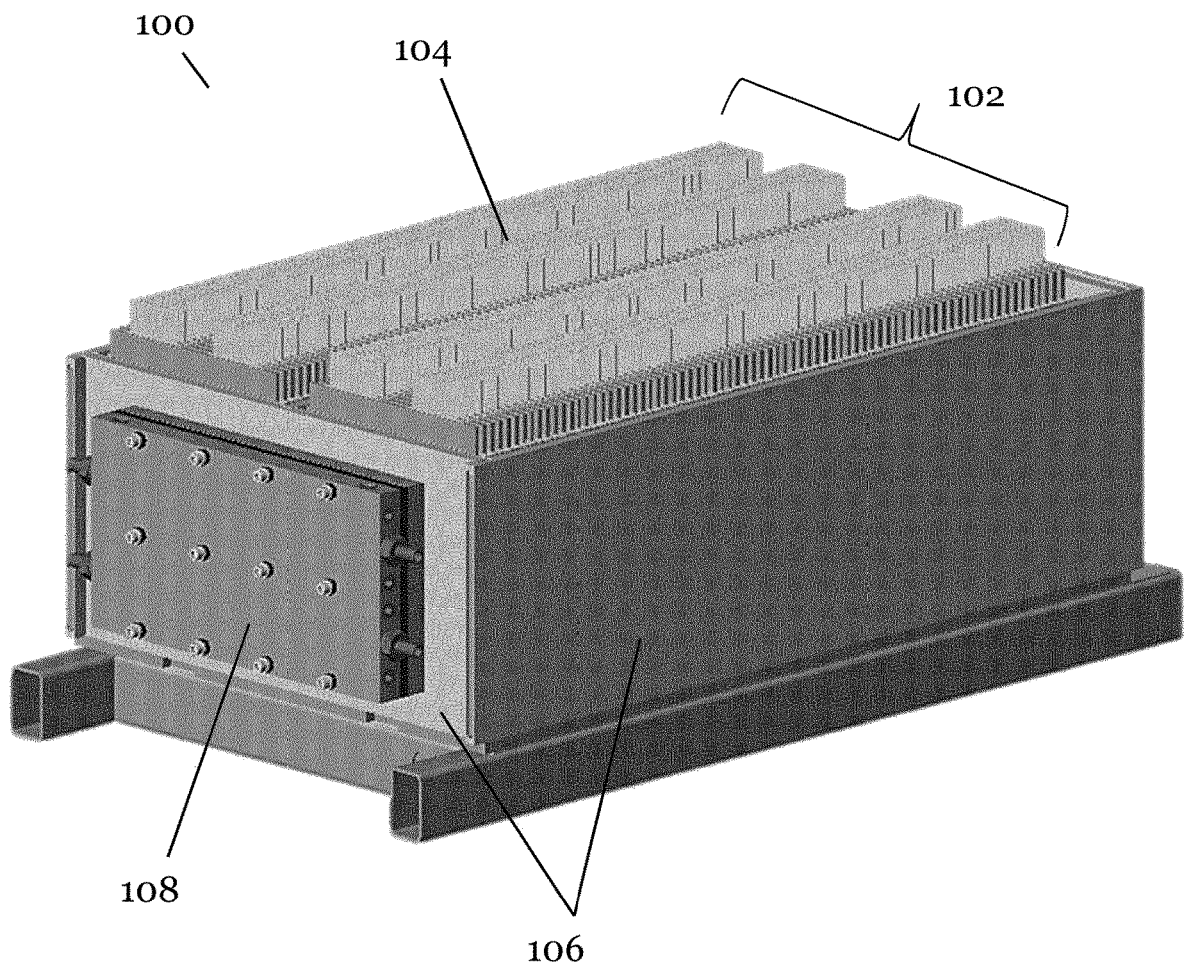
FIG. 1 shows a perspective view of an example of a system as described herein.

With reference to FIG. 1, a system 100 for thermal management of an electrical component 102 is described. Optionally, system 100 may be provided within a vehicle 140 (see FIG. 6). Vehicle 140 may be an electric vehicle. Alternatively, system 100 may be a static or stationary arrangement, for example, a system for the thermal management of a battery or other energy storage device in a domestic or commercial application.

System 100 comprises one or more panels 106. Each panel 106 comprises a plurality of passages for conveying a working fluid around the panel. These passages are internal to the panel, i.e. are formed within cavities within the panels 106. The one or more panels are arranged to form a hermetically sealed system such that the working fluid is configured to communicate heat energy around the sealed system formed of the passages of each panel 106.

In some arrangements, one panel may be provided. Alternatively, two or more panels may be provided, either arranged independently of the other panels to form separate hermetically sealed systems, or fluidly coupled to one another in any suitable configuration to form one or more hermetically sealed systems through which the working fluid can be conveyed. For example, two panels may be independently arranged on long sides of electrical component 102, or four panels may be arranged as to surround the electrical component in a band (i.e., to be provided on both two long and two short sides of the component). These four panels may comprise independent sealed systems, or may be joined to form one or more sealed systems for the working fluid to circulate within.

The one or more panels 106 are thermally coupled to the electrical component 102 to communicate heat energy to or from the electrical component 102. In the following description, electrical component 102 is a battery 102 comprising a plurality of battery cells 104, but system 100 may be employed for the thermal management of any other suitable electrical component which requires in-situ cooling (or heating), for example, the cooling of components of a processor or other electrical system. For example, system 100 can be employed for the in-situ cooling (or heating) of a generator or processor, or an electrical component such as a transformer, a capacitor, a resistor, or an inductor.

System 100 further comprises a heat exchanger mechanism 108 which is in thermal communication with at least one of panels 106 so as to communicate heat energy to and/or from the electrical component 102 such as the battery via the panels 106. The one or more panels 106 may be thermally coupled to the heat exchanger mechanism 108 using a thermal paste or gel. The heat exchanger may then be mechanically clamped onto one of the panels 106. For a permanent coupling, thermal adhesive may instead be used.

In the following description, the working fluid comprises a working fluid in both liquid and gaseous phases, wherein the working fluid is configured to communicate heat energy around the sealed system through evaporation of the liquid at one location of the sealed system and condensation of the liquid at a different location of the sealed system. In other words, the working fluid passively circulates around the sealed system. The panels thus operate as heat pipes to communicate heat energy around the sealed system. The working fluid used in the system described herein may be water or ammonia, for example. However, there are a multitude of working fluids that can be used including water, ammonia, acetone, alcohols and blends thereof; the efficacy of these are driven by the conditions in which the panel is used. The skilled person will be able to identify suitable fluids for any given set of working conditions and temperature operating ranges.

It is also envisaged that in other arrangements the working fluid is arranged merely to communicate heat energy around the sealed system without evaporation and/or condensation mechanisms. For example, the working fluid may be water or a refrigerant, and the heat exchanger mechanism may be arranged to actively circulate said working fluid around the sealed system, by way of a pump or a compressor, for example.

Figure 2:
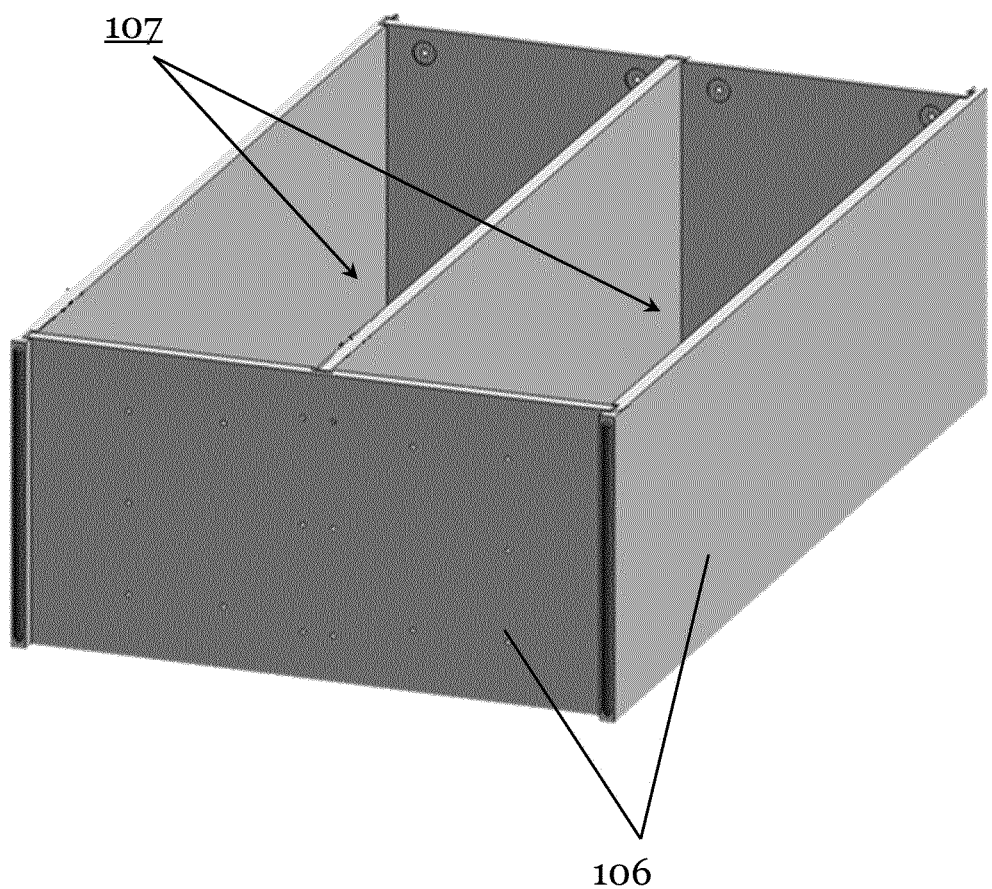
FIG. 2 shows a perspective view of a plurality of panels of the system of FIG. 1.

As described further with reference to FIG. 2, it can be seen that in some examples the panels 106 can be arranged to substantially surround the cells 104 of the battery 102. In particular, the panels 106 are arranged to form a box defining one or more cavities 107 in which the battery 102, or any other suitable electrical component, can be located. It will be understood that the box formed by the panels 106 may take any suitable form or shape. In some arrangements, the cavities 107 may be entirely enclosed by the panels 106, in other arrangements, the box shown in FIG. 2 may be open on more than one side. Fewer panels can provide easier instalment of the electrical component 102 inside the cavities 107, and may also reduce the cost and complexity of manufacturing of the system. For example, as described above, two independent panels may be used or a band of four panels may be used.

With reference to FIGS. 3A-3D, a structure of the panels is described in more detail. Two panels 106a, 106b are described here, mechanically and fluidly coupled to one another by a joining member 110, but it will be understood that more than two panels may be provided, or that the joining member 110 may be omitted and the panels 106a, 106b may be directly coupled, both mechanically and fluidly, to one another.

Figure 3A:
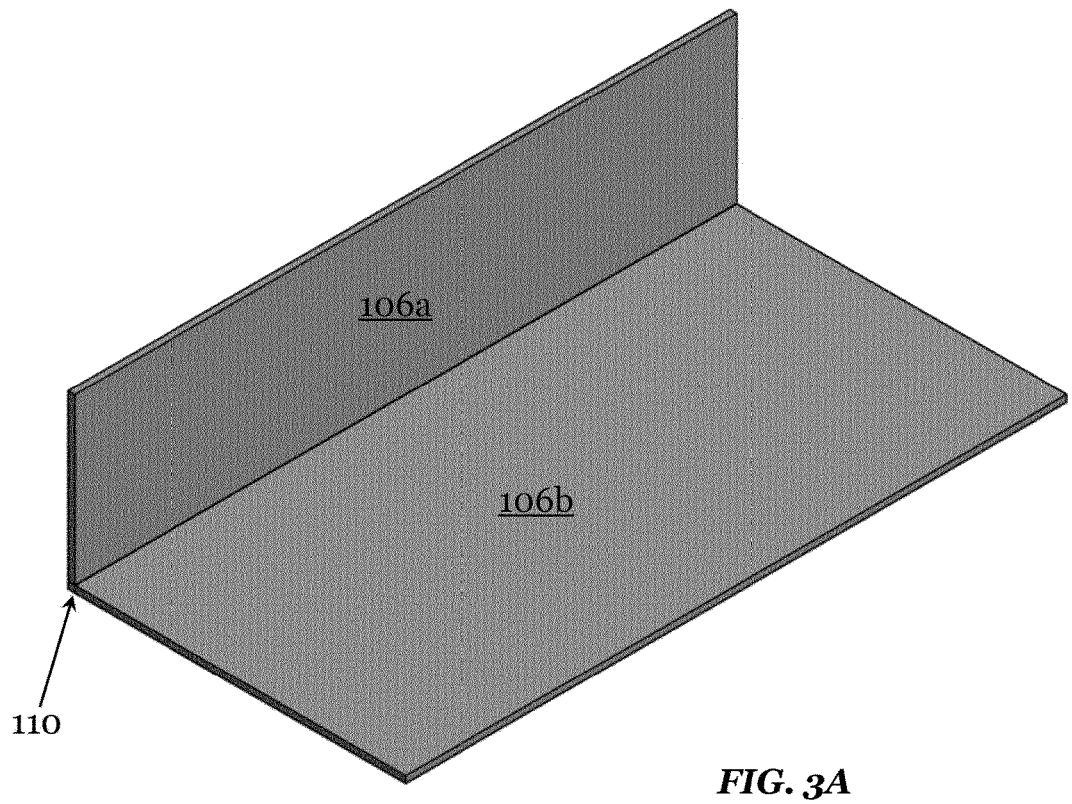
FIG. 3A shows a perspective view of an example of two panels as described herein.
Figure 3B:
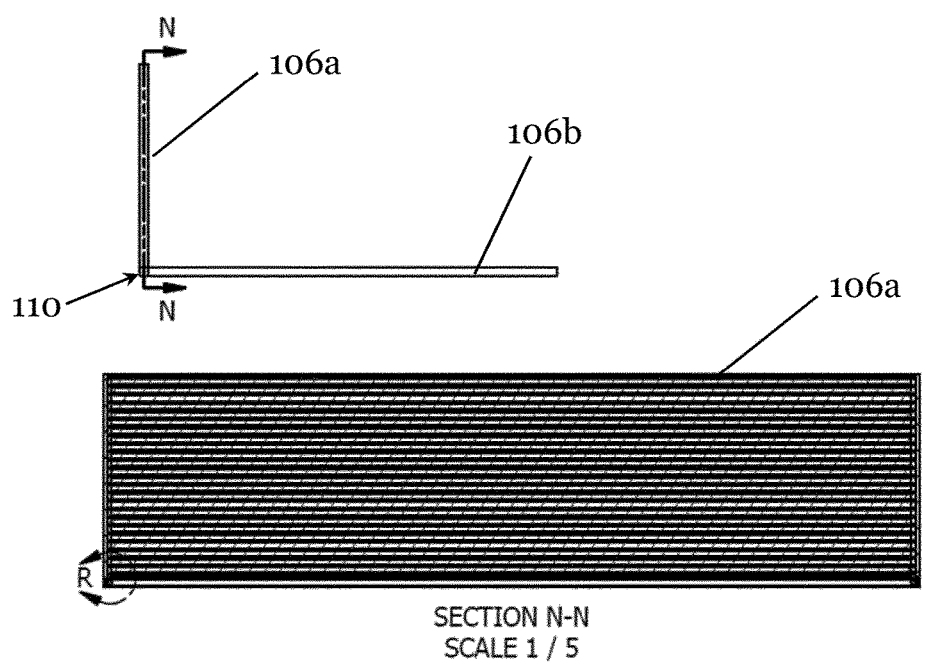
FIG. 3B shows a section of the panels of FIG. 3A.
Figure 3C:
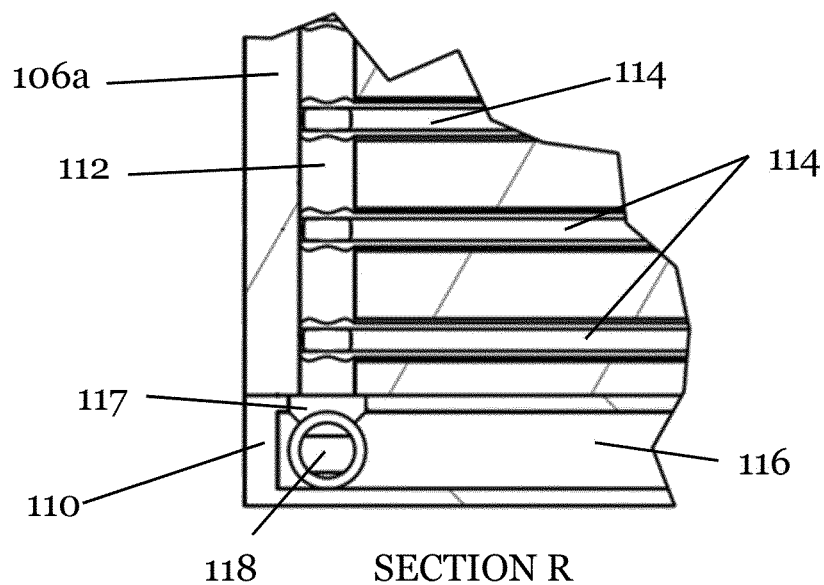
FIG. 3C shows a section of the cross section of FIG. 3B.

With reference to FIGS. 3B and 3C, a section N-N of panel 106a and joining member 110 is described, with details of the section being further illustrated in Section R. It can be seen that panel 106a comprises two primary passages 112 and a plurality of secondary passages 114; the primary and secondary passages are in fluid communication. In some arrangements, the secondary passages extend in a direction that is generally perpendicular to that in which the primary passages 112 extend. In some arrangements, each of the one or more primary passages can have a cross-sectional area greater than a cross-sectional area of each of the one or more secondary passages, but it will be understood that the cross sectional area of the secondary passages 114 may be larger than that of the primary passages in some arrangements, due to the increase in area which may be provided by the inclusion of protrusions or other features within the secondary passages.

Figure 3D:
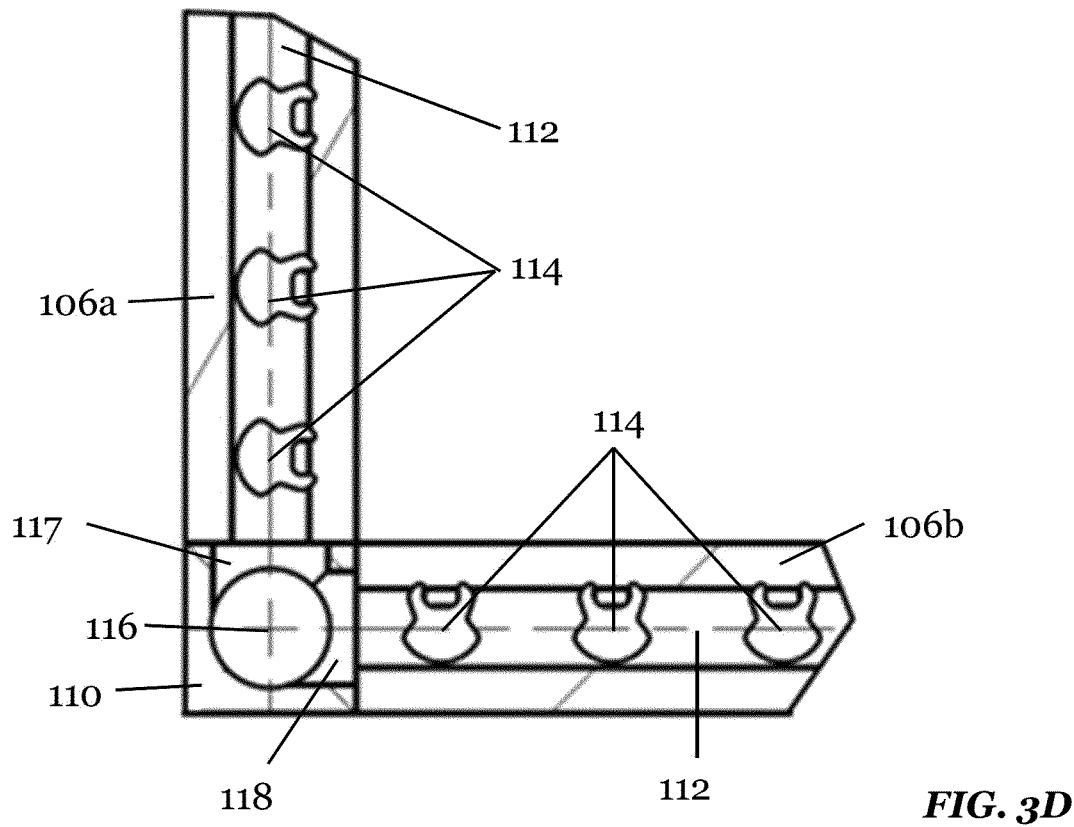
FIG. 3D shows a cross section of the panels of the FIG. 3A.

As illustrated in FIGS. 3C and 3D, the joining member 110 comprises a passage 116 which extends in a direction parallel to the secondary passages 114 in this arrangement (in FIG. 3D, both the secondary passages 114 and passage 116 extend out of the page). Secondary passage 112 is fluidly coupled to the passage 116 by passage section 117. The joining member 110 further comprises a passage 118 (here extending out of the page as viewed in FIG. 3C) which fluidly couples the secondary passage 112 of panel 106a to the corresponding secondary passage of 106b. In other words, panels 106a and 106b can be fluidly coupled to one another through the secondary passages 112 via the passages 116, 117 and 118 of joining member 110.

The passages 116, 117, 118 of each joining member 110 have a cross-sectional area greater than a cross-sectional area of the primary passages. This arrangement may provide for simpler manufacturing and assembly of the panels, as well as facilitating the improved flow of fluid around the sealed system. In particular, when the passages of the joining member have a greater diameter than the diameter of the primary passages 112, fluid may flow more effectively around the corners shown in Section R and FIG. 3D; fluid can thus flow more effectively between the two panels 106a, 106. More effective heat transfer between panels may therefore be provided.

FIG. 3D also illustrates an example cross section of the secondary passages 114, the features of which can provide an increased surface area between the material of the body of the panel 106a, 10b and the cavities within the body which define the secondary passages 114. The geometry of these secondary passages is described in more detail with reference to FIG. 4 of earlier filed UK patent application GB1410924.3 (GB2527338-A), FIG. 4 of which application, and its accompanying description, is hereby incorporated by reference in regard to the geometry of these passages.

The panels 106 can be positioned horizontally or vertically, with the secondary passages 114 arranged horizontally (or generally horizontally) or vertically (or generally vertically). In the examples described with reference to FIGS. 3A-3D, the secondary passages 114 are arranged to lie generally horizontally, such that condensation and evaporation of the working fluid occurs within the cross section of the secondary passages across the panel (rather than the case where the secondary passages are orientated, vertically such that condensed working fluid falls to the bottom of the panel 106). Changes in internal pressures and temperature gradients can facilitate movement of the working fluid around the sealed system, as will be described below in more detail. The skilled person will understand that any suitable orientation of the secondary passages 114 may be provided.

Figure 4:
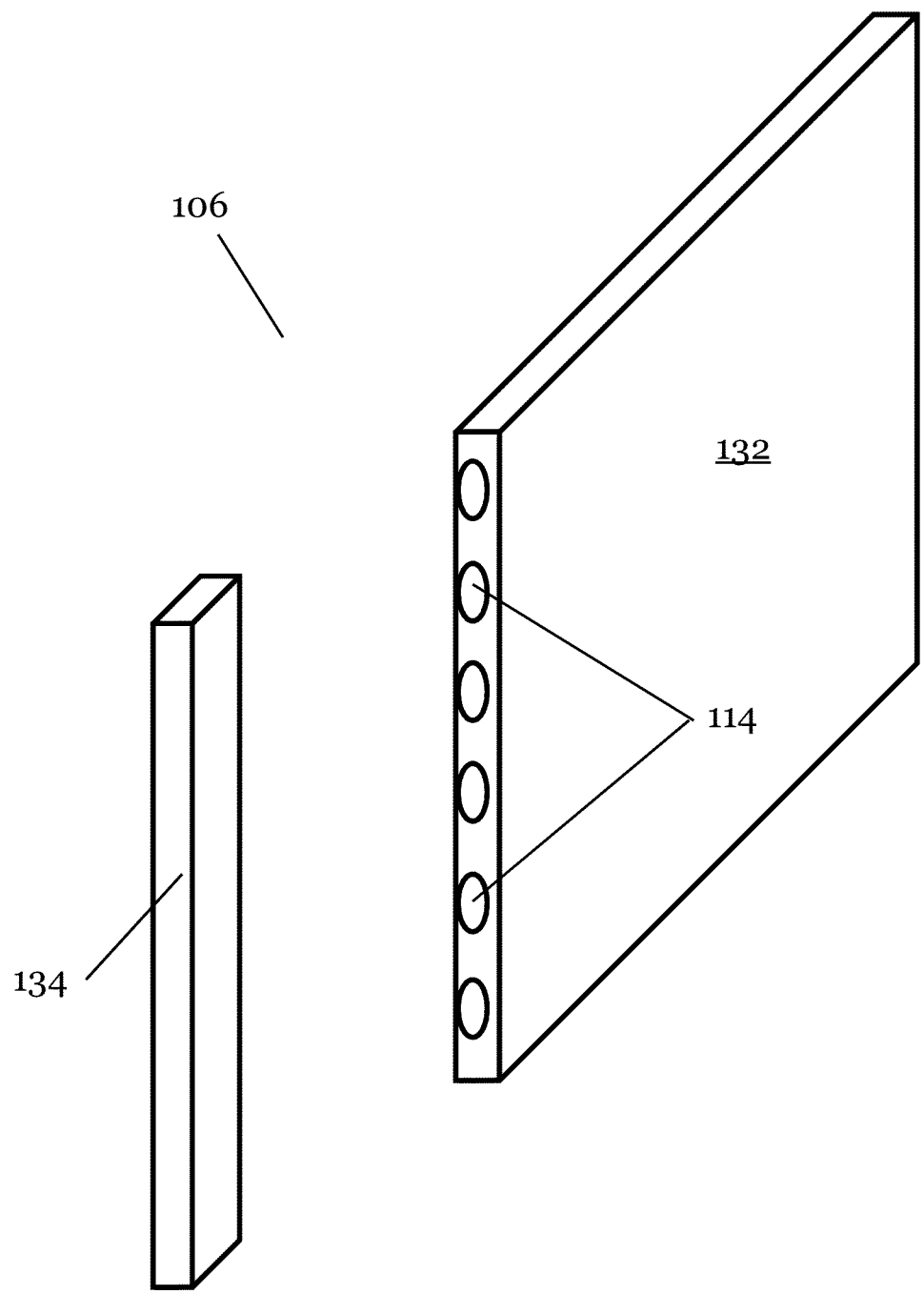
FIG. 4 schematically illustrates components which make up a panel.

With reference to FIG. 4, it will be understood that each panel 106 may be manufactured by extrusion, or by any other suitable manufacturing process. For example, the main body 132 of each panel 106 may be formed of extruded aluminium or an aluminium alloy. Extrusion can enable complex geometries of secondary passages 114 to be formed, which may facilitate improved phase change of the working fluid and thus improved heat transfer. Aluminium is also relatively inexpensive, has good anti-corrosion properties, and is easy to work in a manufacturing process. Due to the structural strength within the aluminium extrusion, when system 100 comprising the panels 106 is incorporated into a vehicle, optionally an electric vehicle, the panels can be used to provide rigity to the vehicle. Alternatively, an aluminium alloy or another metal such as steel may be used.

Optionally, each panel further comprises one or more manifolds 134, which define, or contribute to defining, the primary passages 112 of each panel. The manifolds 134 are substantially straight. The manifolds 134 are formed of the same material as panel main body 132 and may be coupled to edges of the main body 132 of each panel to allow the primary passages to be fluidly coupled via the secondary passages; in particular, the secondary passages 114 are commonly terminated at each end of the panel body 132 by the manifold 134, sealing the passages which in turns form a liquid- and gas-tight chamber. Interference fitting, welding or gluing can be used to embed the manifold onto the panel main body 132, in the process forming a sealed chamber within the panel 106. The formation of the secondary passages 114 within the panel main body 132 and the use of the manifolds 134 can facilitate relatively straightforward sealing of the plurality of passages, since only a single seal is required at either end of the panel main body 132. Advantageously, the mechanical mounting of the manifolds 134 on the panel main body 132 also forms the seal.

Figure 5:
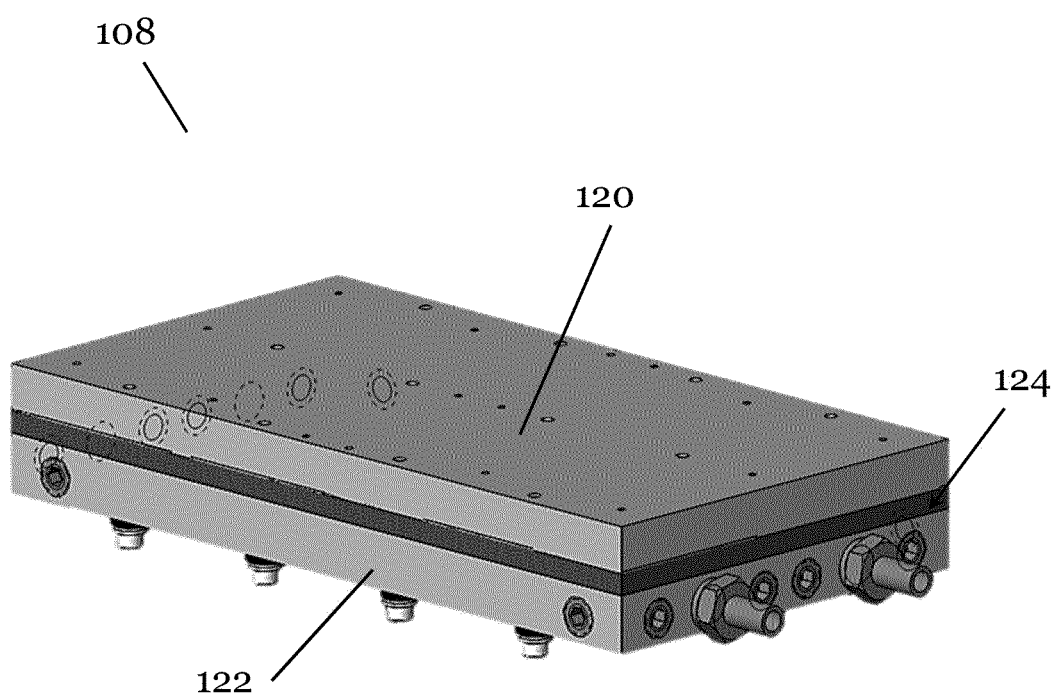
FIG. 5 shows a perspective view of an example heat exchanger of the system of FIG. 1.

With reference to FIG. 5, a heat exchanger mechanism 108 is described which is connected, either directly or indirectly, with a fluid to remove or deliver heat energy to the electrical component 102 as required by system 100. The heat exchanger mechanism 108 described herein is a thermoelectric assembly (i.e. a Peltier device) comprising a cold side plate 120, which may be formed of aluminium, a hot side plate 122 and foam insulation 124 separating the hot and cold sides and containing thermoelectric modules. The hot plate side 124 comprises channels for receiving a fluid. The fluid may be in fluid communication with a heat sink, for example, to absorb excess heat from the electrical component 102 to which the heat exchanger mechanism 108 is thermally coupled via the panels 106.

In other arrangements, the heat exchanger mechanism may not be thermoelectric assembly. Instead, the heat exchanger 108 may be any other suitable form of heat exchanger mechanism. For example, the heat exchanger mechanism can comprise the passing of cold/hot air over the panels, or a thermal fluid running through the heat exchanger mechanism. The skilled person will understand how to choose a suitable heat exchanger for specific applications of system 100. For example, when system 100 is incorporated within a vehicle, passive cooling of the panels may be provided by arranging channels which force air over the panels when the vehicle is moving. Moreover, as described above, when a working fluid is a refrigerant or water or the like, the heat exchange mechanism may be arranged to actively circulate said fluid within the sealed system in addition to exchanging heat between the system and the environment.

As described with reference to FIG. 6, the heat exchanger mechanism 108 may be in fluid communication with one or more fluid pumps 126 of system 100, the fluid pump(s) 126 arranged to pump fluid through the heat exchanger 108 to communicate heat energy to and/or from the electrical component 102 via the plurality of panels 106. Optionally, the fluid being provided to the heat exchanger is a refrigerant.

In some arrangements, system 100 may further comprise a heat tank 128 and/or a cold tank or other low temperature storage device 130 for storing a cooling fluid. The heat tank 128 is for providing a heating fluid to the heat exchanger 108, wherein in an active heating mode of operation, the one or more fluid pumps 126 are arranged to pump the heating fluid through a first inlet 128a of the heat exchanger. The cold temperature storage device 130 is for providing a cooling fluid to the heat exchanger 108, wherein in an active cooling mode of operation, the one or more fluid pumps 126 are arranged to pump the cooling fluid through a second inlet 130a of the heat exchanger 108.

In order to use the panels 106 to cool the electrical component, i.e. to transfer heat away from the electrical component 102 to environment via the heat exchanger 108, a cooling fluid (for example a liquid or vapour) at a temperature that is at least a few Kelvin lower than the panels is provided from the low temperature storage device 130 to the heat exchanger mechanism 108. Heat energy is then transferred from the panels 106, thermally coupled to the heat exchanger, to the heat exchanger. In response to this flow of heat energy, a portion of the sealed system through which the working fluid circulates is cooled, causing a vapour phase of the working fluid to condense within the secondary passages 114 of the panel 106. Upon condensing, the vapour releases the stored latent heat to the material of the panel 106 which is adjacent the passage in which the working fluid condensed; this latent heat can then be removed from the system through the heat exchanger 108.

The condensing of the working fluid also causes a low pressure region to form. Vapour from other portions of the sealed system then travels towards the cooler, lower pressure, areas of the sealed system, causing the condensed liquid to also travel around the sealed system away from the cooler section and to a warmer portion of the sealed system by the action of gravity and the internal pressures within the sealed system (for example from gas pressure resulting from the evaporation-condensation cycle within the panel). The heat energy in the warmer part of the sealed system evaporates the working fluid, turning it from liquid to vapour through the absorption of latent heat of evaporation. This evaporation thus uses more heat energy than does heating without phase change. The heated vapour travels around the sealed system along the passages 112, 114 towards the cooler, lower pressure regions, and again condenses in a cooler part of the sealed system near the heat exchanger 108. The vaporization-condensation cycle can then repeat again. The skilled person will understand how the process may be reversed to cause the panels 106 to warm the electrical component 102 by providing a heating fluid from the heat tank 128 to the heat exchanger mechanism 108.

The above described effect causes heat energy to be distributed substantially evenly across the panels 106, which are in thermal communication with the electrical component 102, and thus can cause the heat energy to be distributed evenly across the electrical component also. As such, temperature differences between different locations around the system are minimised. Moreover, the amount of heat energy that is transferred is significantly greater than can be achieved through conduction by an inexpensive metal of comparable weight and size to the panels 106 by use of a working fluid as described herein. This is achieved without the use of any wicking structure or material. More energy efficient cooling of an electrical component can therefore be provided.

Figure 6:
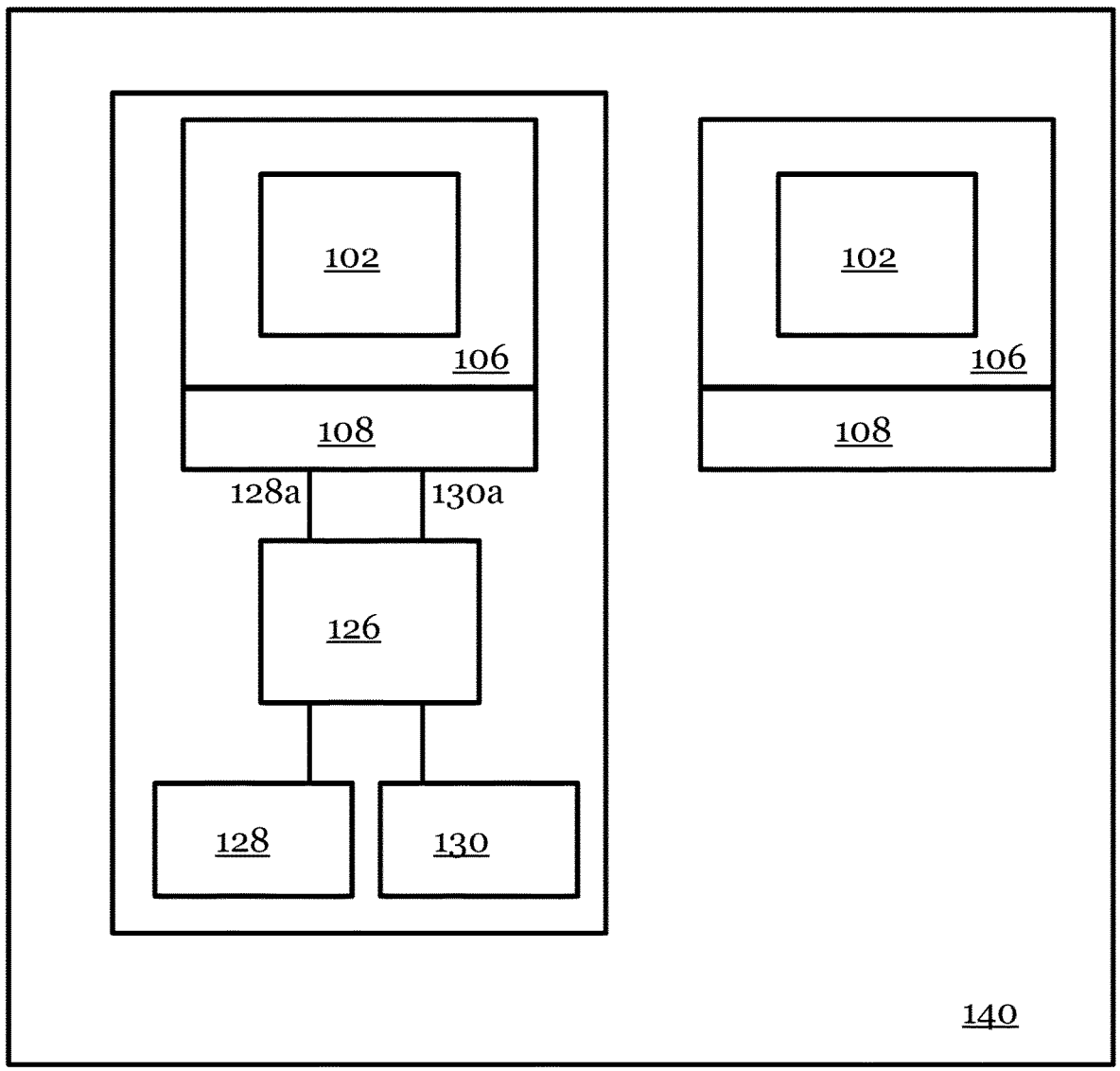
FIG. 6 schematically illustrates example implementations of the system of FIG. 1.

Any of the implementations of system 100 described above may be implemented within vehicle 140, as illustrated in FIG. 6. Optionally, vehicle 140 is an electric vehicle or a hybrid vehicle which uses two or more distinct types of power; for example, a hybrid vehicle may use an internal combustion engine to drive an electric generator that powers an electric motor. Vehicle 140 may be a car, a bus, a train, a lorry, or any other suitable vehicle. Alternatively, any of the above described implementations of system 100 may be implemented a static or stationary system arrangement, for example, a as a system for the thermal management of a battery or other energy storage device in a domestic or commercial application, or for the in-situ thermal management of a generator or processor or another electrical component or device.

It is noted herein that while the above describes various examples of system, these descriptions should not be viewed in a limiting sense. Rather, there are several variations and modifications which may be made without departing from the scope of the present invention as defined in the appended claims.

The invention claimed is:

1. A system comprising:
 an electric vehicle battery;
 a working fluid comprising both liquid and vapor phases;
 a plurality of panels coupled, both fluidly and mechanically, to form a structure that is arranged around and thermally coupled to the electric vehicle battery, each one of the plurality of panels comprising a network of interconnected passages configured to convey the working fluid around the respective panel to provide an isothermal surface, the plurality of panels being arranged to form a hermetically sealed system consisting of the interconnected passages, the working fluid being configured to passively circulate around the sealed system without a wicking structure or material, the passive circulation being by the action of gravity and internal pressures from evaporation of the liquid at a first location of the sealed system and condensation of the vapor at a second location of the sealed system to communicate heat energy around the sealed system;
 a heat exchanger physically and thermally coupled to a side of one of the plurality of panels so as to communicate heat energy to and/or from the electric vehicle battery via the plurality of panels in an isothermal manner; and
 one or more fluid pumps arranged to pump a second fluid through the heat exchanger.

2. The system of claim 1, wherein, for each of the plurality of panels, the plurality of passages comprises one or more primary passages and one or more secondary passages.

3. The system of claim 2, wherein the one or more primary passages extend in a direction perpendicular to a direction in which the one or more secondary passages extend.

4. The system of claim 1, wherein the plurality of panels are arranged to surround the electric vehicle battery.

5. The system of claim 1, wherein the plurality of panels are arranged to form a box defining a cavity in which the electric vehicle battery is located.

6. The system of claim 2, wherein the plurality of panels are fluidly coupled to one another through the primary passages.

7. The system of claim 6, wherein the primary passages are fluidly coupled through respective joining members, each joining member having one or more passages of a cross-sectional area greater than a cross-sectional area of the primary passages.

8. The system of claim 7, wherein the joining members are further arranged to mechanically couple the plurality of panels.

9. The system of claim 1, wherein the second fluid is a cooling fluid, the system further comprising:
 a low temperature storage device configured to provide the cooling fluid, wherein in an active cooling mode of operation, the one or more fluid pumps are arranged to pump the cooling fluid through a second inlet of the heat exchanger.

10. The system of claim 1, wherein the heat exchanger comprises a thermoelectric device.

11. A vehicle comprising the system of claim 1.

12. The system of claim 1, wherein the plurality of panels are directly coupled.

13. The system of claim 1, wherein each of the plurality of panels provides an isothermal surface thermally coupled to the electric vehicle battery, configured to cool and/or heat the electric vehicle battery in an isothermal manner.

14. A method for heating or cooling the electric vehicle battery of the system according to claim 1, the method comprising passively circulating a working fluid around each of the plurality of panels, the passive circulation being by the action of gravity and internal pressures from evaporation of the liquid at a first location of the sealed system and condensation of the vapor at a second location of the sealed system to communicate heat energy around the sealed system; and communicating heat energy to and/or from the electric vehicle battery via the circulation of the working fluid around each of the plurality of panels.

15. The method of claim 14, wherein the communication of the heat energy is an isothermal communication of energy via an isothermal surface of each of the plurality of panels.

16. A system comprising:
 an electric vehicle battery;
 a working fluid comprising both liquid and vapor phases;
 a plurality of panels coupled, both fluidly and mechanically, to form a structure that is arranged around and thermally coupled to the electric vehicle battery, each one of the plurality of panels comprising a network of interconnected passages configured to convey the working fluid around the respective panel to provide an isothermal surface, the plurality of panels being arranged to form a hermetically sealed system consisting of the interconnected passages, the working fluid being configured to passively circulate around the sealed system without a wicking structure or material, the passive circulation being by the action of gravity and internal pressures from evaporation of the liquid at a first location of the sealed system and condensation of the vapor at a second location of the sealed system to communicate heat energy around the sealed system;

a heat exchanger in thermal communication with at least one of the plurality of panels so as to communicate heat energy to and/or from the electric vehicle battery via the plurality of panels in an isothermal manner, the heat exchanger not being in fluid communication with the interconnected passages of the plurality of panels; and one or more fluid pumps arranged to pump a second fluid through the heat exchanger.

17. A system comprising:

an electric vehicle battery;

a working fluid comprising both liquid and vapor phases;

a plurality of panels coupled, both fluidly and mechanically, to form a structure that is arranged around and thermally coupled to the electric vehicle battery, each one of the plurality of panels comprising a network of interconnected passages configured to convey the working fluid around the respective panel to provide an isothermal surface, the plurality of panels being arranged to form a hermetically sealed system consisting of the interconnected passages, the working fluid being configured to passively circulate around the sealed system without a wicking structure or material, the passive circulation being by the action of gravity and internal pressures from evaporation of the liquid at a first location of the sealed system and condensation of the vapor at a second location of the sealed system to communicate heat energy around the sealed system; and a heat exchanger physically and thermally coupled to a side of one of the plurality of panels so as to communicate heat energy to and/or from the electric vehicle battery via the plurality of panels in an isothermal manner, wherein, for each of the plurality of panels, the plurality of passages comprises one or more primary passages and one or more secondary passages, wherein the plurality of panels are fluidly coupled to one another through the primary passages, the primary passages being fluidly coupled through respective joining members, each joining member having one or more passages of a cross-sectional area greater than a cross-sectional area of the primary passages.

18. The system of claim 17, wherein the working fluid is selected from water, ammonia, acetone, alcohols and blends thereof.

19. The system of claim 1, wherein the working fluid is selected from water, ammonia, acetone, alcohols and blends thereof.

* * * * *